(12) United States Patent
Yokoyama et al.

(10) Patent No.: US 10,493,801 B2
(45) Date of Patent: *Dec. 3, 2019

(54) CAP TREAD RUBBER COMPOSITION FOR COLD WEATHER TIRES

(71) Applicant: SUMITOMO RUBBER INDUSTRIES, LTD., Kobe-shi, Hyogo (JP)

(72) Inventors: Yuka Yokoyama, Kobe (JP); Shuichiro Ono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 15/721,054

(22) Filed: Sep. 29, 2017

(65) Prior Publication Data

US 2018/0093531 A1 Apr. 5, 2018

(30) Foreign Application Priority Data

Sep. 30, 2016 (JP) ................................. 2016-193694

(51) Int. Cl.
  *B60C 1/00* (2006.01)
  *C08L 9/00* (2006.01)

(52) U.S. Cl.
  CPC .............. *B60C 1/0016* (2013.01); *C08L 9/00* (2013.01); *B60C 2001/0083* (2013.01); *C08L 2205/02* (2013.01); *C08L 2205/03* (2013.01)

(58) Field of Classification Search
  CPC ....... B60C 1/0016; B60C 11/00; B60C 11/14; C08L 7/00; C08L 19/00; C08K 5/0016; C08K 7/02
  USPC ........................................... 152/209.1, 209.5
  See application file for complete search history.

(56) References Cited

U.S. PATENT DOCUMENTS

| | | | |
|---|---|---|---|
| 5,788,786 A * | 8/1998 | Yamauchi | B60C 1/0016 152/209.1 |
| 6,114,432 A * | 9/2000 | Takagishi | C08K 3/36 524/494 |
| 6,313,213 B1 * | 11/2001 | Nakamura | B60C 1/0016 524/424 |
| 6,355,728 B1 * | 3/2002 | Kawazura | B60C 1/00 152/209.1 |
| 6,472,461 B1 | 10/2002 | Nakamura et al. | |
| 8,813,802 B1 * | 8/2014 | Lambert | C08K 9/10 152/450 |
| 2008/0110544 A1 * | 5/2008 | Nakamura | B60C 1/0025 152/525 |
| 2010/0184908 A1 * | 7/2010 | Kikuchi | B60C 1/0016 524/526 |
| 2011/0166254 A1 * | 7/2011 | Nishimura | B60C 1/0016 523/155 |
| 2011/0230613 A1 * | 9/2011 | Hiro | B60C 1/0016 524/502 |
| 2012/0225974 A1 * | 9/2012 | Uno | B60C 1/0016 523/155 |
| 2015/0247027 A1 * | 9/2015 | Kojima | C08L 9/00 524/526 |
| 2015/0361252 A1 * | 12/2015 | Mabuchi | C08L 7/00 524/526 |
| 2016/0297947 A1 | 10/2016 | Sakaki et al. | |
| 2017/0174876 A1 | 6/2017 | Maejima | |
| 2017/0218170 A1 * | 8/2017 | Hatano | B60C 1/00 |

FOREIGN PATENT DOCUMENTS

| | | |
|---|---|---|
| JP | 01-165635 A | 6/1989 |
| JP | 10-237224 A | 9/1998 |
| JP | 11-021381 A | 1/1999 |
| JP | 11-29660 A | 2/1999 |
| JP | 2001-287508 A | 10/2001 |
| JP | 2007-211042 A | 8/2007 |
| JP | 2010-185025 A | 8/2010 |
| JP | 2011-16905 A | 1/2011 |
| JP | 2015-129238 A | 7/2015 |
| JP | 2016-006139 A | 1/2016 |
| WO | WO 2015/098419 A1 | 7/2015 |
| WO | WO 2015/152398 A1 | 10/2015 |

OTHER PUBLICATIONS

Office Action dated Jul. 25, 2017 in Japanese Patent Application No. 2016-193694 (with English Translation).
U.S. Office Action, dated Mar. 8, 2018, for U.S. Appl. No. 15/720,096.
Zeon Corporation, "General-Purpose Rubber—BR (Polybutadiene Rubber)," retrieved from URL:http://www.zeon.co.jp/business/enterprise/rubber/rubber_br.html, retrieved on Mar. 20, 2018, pp. 1-2, with English translation (3 pages total).

* cited by examiner

*Primary Examiner* — Jane L Stanley
(74) *Attorney, Agent, or Firm* — Birch, Stewart, Kolasch & Birch, LLP

(57) ABSTRACT

Provided are a cap tread rubber composition for cold weather tires enabling a balanced improvement in fuel economy, abrasion resistance, performance on ice/snow, and high-speed performance on snow-/ice-free cold roads, and a cold weather tire formed from the same. The rubber composition contains: a rubber component including BR, SBR, and NR and/or IR; and a filler, the composition having a combined amount of NR, IR, and BR of 80% by mass or more, an amount of BR of 30% by mass or more, and an amount of SBR of 0.3-10% by mass, each per 100% by mass of the rubber component, the filler including 60% by mass or more of silica per 100% by mass of the filler, the composition containing, per 100 parts by mass of the rubber component, 50 parts by mass or more of a fine particle silica having a $N_2SA$ of 190 $m^2/g$ or more.

6 Claims, No Drawings

CAP TREAD RUBBER COMPOSITION FOR COLD WEATHER TIRES

TECHNICAL FIELD

The present invention relates to a cap tread rubber composition for cold weather tires, and a cold weather tire formed from the rubber composition. The term "cold weather tire" as used herein refers to any tire that is intended to be used at low temperatures and has good performance on ice or snow. Specifically, it conceptually includes any of the following tires: snow tires marked on sidewalls as M+S, M.S, or M&S, and tires for the winter season and/or cold weather sold as winter tires or studless winter tires.

BACKGROUND ART

In view of low-temperature properties, rubber components consisting only of natural rubber and polybutadiene rubber have been widely used in cap treads of cold weather tires. A further technique that has been used to improve performance on ice is to foam a rubber component (see Patent Literature 1).

Moreover, due to the recent improvement of road conditions, more and more vehicles with cold weather tires are driven at high speeds. However, since conventional cold weather tires place an importance on the performance on ice and snow achieved during running at relatively low speeds, they tend to show inferior handling stability and grip performance during high speed running.

Particularly in the case of fine particle silica-containing formulations, which are considered promising due to their properties such as abrasion resistance and fuel economy, it is difficult to control the distribution of fine particle silica between the polybutadiene rubber layer and the natural rubber layer and the dispersion thereof in the rubber layers. Thus, tires with such formulations tend to be greatly inferior in high speed performance on snow- and ice-free roads to summer tires.

Thus, a need exists for a technique to improve high speed performance (handling stability, grip performance) on snow- and ice-free cold roads while ensuring performance on ice and snow, thereby achieving a balanced improvement in properties including fuel economy, abrasion resistance, performance on ice and snow, and high speed performance (handling stability, grip performance) on snow- and ice-free cold roads.

CITATION LIST

Patent Literature

Patent Literature 1: JP 2015-129238 A

SUMMARY OF INVENTION

Technical Problem

The present invention aims to solve the problems and provide a cap tread rubber composition for cold weather tires enabling a balanced improvement in fuel economy, abrasion resistance, performance on ice and snow, and high speed performance (handling stability, grip performance) on snow- and ice-free cold roads, and a cold weather tire formed from the rubber composition.

Solution to Problem

The present invention relates to a cap tread rubber composition for cold weather tires, containing: a rubber component including polybutadiene rubber, styrene butadiene rubber, and at least one of natural rubber or polyisoprene rubber; and a filler, the rubber composition having a combined amount of the natural rubber, the polyisoprene rubber, and the polybutadiene rubber of 80% by mass or more, an amount of the polybutadiene rubber of 30% by mass or more, and an amount of the styrene butadiene rubber of 0.3% to 10% by mass, each based on 100% by mass of the rubber component, the filler including 60% by mass or more of silica based on 100% by mass of the filler, the rubber composition containing a fine particle silica having a nitrogen adsorption specific surface area of 190 $m^2/g$ or more in an amount of 50 parts by mass or more per 100 parts by mass of the rubber component.

Preferably, the rubber composition has a combined amount of the natural rubber, the polyisoprene rubber, and the polybutadiene rubber of 90% by mass or more, and an amount of the styrene butadiene rubber of 0.3% to 5% by mass, each based on 100% by mass of the rubber component.

Preferably, the rubber composition contains the silica in an amount of 80 parts by mass or more per 100 parts by mass of the rubber component, and the fine particle silica has a nitrogen adsorption specific surface area of 210 $m^2/g$ or more.

The polybutadiene rubber preferably has a cis content of 70% by mass or more.

The rubber composition preferably contains a plasticizer in an amount of 20 parts by mass or more per 100 parts by mass of the rubber component.

The present invention also relates to a cold weather tire, including a cap tread formed from the rubber composition.

Advantageous Effects of Invention

The cap tread rubber composition for cold weather tires of the present invention contains predetermined amounts of a rubber component including polybutadiene rubber, styrene butadiene rubber, and natural rubber and/or polyisoprene rubber, and a specific filler. Such a rubber composition enables a balanced improvement in fuel economy, abrasion resistance, performance on ice and snow, and high speed performance (handling stability, grip performance) on snow- and ice-free cold roads.

DESCRIPTION OF EMBODIMENTS

[Cap Tread Rubber Composition for Cold Weather Tires]

The cap tread rubber composition for cold weather tires of the present invention contains predetermined amounts of a rubber component including polybutadiene rubber (BR), styrene butadiene rubber (SBR), and natural rubber (NR) and/or polyisoprene rubber (IR), and a filler including silica. The silica includes a predetermined amount of a fine particle silica having a nitrogen adsorption specific surface area of at least a predetermined value.

As described above, in the case of fine particle silica-containing formulations, it is usually difficult to control the distribution of the silica among layers of different rubbers such as BR and NR and the dispersion thereof in the rubber layers. In the present invention, in contrast, since a rubber component including predetermined amounts of BR and NR and/or IR and a small amount of SBR is incorporated in a silica-containing formulation containing a predetermined amount of fine particle silica, such a formulation shows improved processability so that the morphology can be stabilized, despite the fact that it is a system containing BR and NR and/or IR, the morphology of which is difficult to control. Thus, it is possible to achieve a uniform distribution of fine particle silica among the rubber layers and further to improve the dispersion of silica in the rubber layers, thereby improving high speed performance (handling stability, grip performance) on snow- and ice-free cold roads.

Thus, according to the present invention, it is possible to improve high speed performance (handling stability, grip performance) on snow- and ice-free cold roads while obtaining good fuel economy, abrasion resistance, and performance on ice and snow, thereby significantly improving the balance of these properties. In particular, by adding a small amount of SBR to a certain formulation containing predetermined amounts of fine particle silica, BR, and NR and/or IR according to the present invention, the following effect is achieved: the balance of the properties is significantly (synergistically) improved as compared to when such SBR is added to other formulations.

The cap tread rubber composition contains NR and/or IR. Any NR or IR may be used including those known in the tire field.

The combined amount of NR and IR based on 100% by mass of the rubber component is preferably 20% by mass or more, more preferably 25% by mass or more. When the combined amount is 20% by mass or more, good fuel economy can be provided. The combined amount is preferably 60% by mass or less, more preferably 50% by mass or less, still more preferably 45% by mass or less. When the combined amount is 60% by mass or less, good performance on ice and snow and good abrasion resistance can be ensured.

The cap tread rubber composition incorporates BR. Any BR may be used including those known in the tire field. High-cis BR, among others, can be suitably used. The BR may also suitably be modified BR.

The amount of BR based on 100% by mass of the rubber component is 30% by mass or more. When the amount is 30% by mass or more, good performance on ice and snow (low-temperature performance) and good abrasion resistance can be provided. The amount of BR is preferably 35% by mass or more, more preferably 40% by mass or more. The upper limit of the amount of BR is preferably 80% by mass or less, more preferably 70% by mass or less. When the amount is 80% by mass or less, high speed performance on snow- and ice-free cold roads can be ensured.

The BR preferably has a cis content of 70% by mass or more, more preferably 90% by mass or more, still more preferably 95% by mass or more. The use of such high-cis BR allows for a balanced improvement in low-temperature performance and abrasion resistance. The amount of high-cis BR based on 100% by mass of BR is preferably 50% by mass or more, more preferably 90% by mass or more, most preferably 100% by mass.

The cis content herein can be determined by infrared absorption spectrum analysis or NMR analysis.

Any modified BR may be used, such as BR containing a modifying group interactive with silica. In particular, the modified BR is preferably one in which at least an alkoxysilane compound is bound to the active terminal of a polybutadiene having a cis content of 70% by mass or more.

The modified BR can be produced by known methods. For example, it may be produced by a polymerization reaction of butadiene in the presence of a polymerization catalyst to produce a butadiene polymer, followed by modification (hereinafter, also referred to as "modification reaction") of the active terminal of the butadiene polymer with an alkoxysilane compound. The cis content can be adjusted to 70% by mass or more by carrying out polymerization in the presence of a polymerization catalyst as described in WO 03/046020, the disclosure of which is incorporated by reference herein.

The alkoxysilane compound to be used for the modification of the active terminal of the butadiene polymer preferably has two or more reactive groups including an alkoxysilyl group. The reactive group(s) other than alkoxysilyl groups may be any types of reactive groups, preferably functional groups such as epoxy, isocyanate, carbonyl, and cyano groups. The alkoxysilane compound may be in the form of a partial condensate or a mixture of the alkoxysilane compound and the partial condensate.

Suitable examples of the alkoxysilane compound include 3-glycidoxypropyltrimethoxysilane and 3-glycidoxypropyltriethoxysilane, and partial condensates thereof.

The combined amount of NR, IR, and BR based on 100% by mass of the rubber component is 80% by mass or more. When the combined amount is 80% by mass or more, good low-temperature performance can be provided. The combined amount is preferably 85% by mass or more, more preferably 90% by mass or more. The combined amount is preferably 99.7% by mass or less, more preferably 99.0% by mass or less. When the combined amount is 99.7% by mass or. less, high speed performance on snow- and ice-free cold roads can be ensured.

The cap tread rubber composition incorporates SBR. Any SBR may be used, and examples include solution polymerized SBR (S-SBR) and emulsion polymerized SBR (E-SBR).

The amount of SBR based on 100% by mass of the rubber component is 0.3% by mass or more, preferably 0.5% by mass or more, more preferably 1% by mass or more, in order to improve high speed performance (handling stability, grip performance) on snow- and ice-free cold roads. In view of abrasion resistance, the amount of SBR is 10% by mass or less, preferably 9% by mass or less, more preferably 6% by mass or less, still more preferably 5% by mass or less. The incorporation of SBR in the range indicated above improves both grip performance in cold weather, high speed conditions and handling stability during high speed running.

The SBR preferably has a styrene content of 10% by mass or more, more preferably 15% by mass or more. When the styrene content is 10% by mass or more, good performance on ice and snow can be provided. The styrene content is preferably 40% by mass or less, more preferably 35% by mass or less. When the styrene content is 40% by mass or less, the effects of the present invention can be sufficiently achieved. The styrene content herein is determined by $^1$H-NMR analysis.

The rubber component may include other rubbers as long as they do not inhibit the effects of the present invention. Examples of other rubbers include chloroprene rubber (CR), acrylonitrile butadiene rubber (NBR), ethylene-propylene-diene rubber (EPDM), butyl rubber (IIR), and halogenated butyl rubber (X-IIR). Each type of rubber such as NR may be a single material or a combination of two or more materials.

The cap tread rubber composition incorporates a filler including silica.

The total amount of the filler per 100 parts by mass of the rubber component is preferably 10 to 200 parts by mass, more preferably 20 to 180 parts by mass, still more preferably 30 to 150 parts by mass. When the total amount is within the range indicated above, the effects of the present invention can be achieved. Each type of filler such as silica may be a single material or a combination of two or more materials.

Any silica may be used, including, for example, dry silica (anhydrous silicic acid) and wet silica (hydrous silicic acid). Wet silica is preferred as it contains a large number of silanol groups.

The amount of silica based on 100% by mass of the filler is 60% by mass or more. In this case, a balanced improvement in fuel economy, abrasion resistance, and grip performance can be achieved and the effects of the present invention can be well achieved. The amount of silica is preferably 70% by mass or more, more preferably 80% by mass or more. The upper limit of the amount of silica is not particularly limited but is preferably 97% by mass or less, more preferably 95% by mass or less.

In the cap tread rubber composition, the amount of silica per 100 parts by mass of the rubber component is preferably 50 parts by mass or more, more preferably 60 parts by mass or more, still more preferably 80 parts by mass or more, in order to obtain good abrasion resistance and good performance on ice and snow. The upper limit of the amount of silica is not particularly limited, but is preferably 200 parts by mass or less, more preferably 150 parts by mass or less, in order to obtain good processability and good fuel economy.

The silica in the cap tread rubber composition includes a fine particle silica having a nitrogen adsorption specific surface area ($N_2SA$) of 190 $m^2/g$ or more in order to significantly improve abrasion resistance and performance on ice and snow. The $N_2SA$ is preferably 200 $m^2/g$ or more, more preferably 210 $m^2/g$ or more. The upper limit of the $N_2SA$ is not particularly limited, but is preferably 400 $m^2/g$ or less, more preferably 300 $m^2/g$ or less, in order to obtain good workability and good processability. The nitrogen adsorption specific surface area of the silica is determined by the BET method in accordance with ASTM D3037-81.

The fine particle silica preferably has a cetyltrimethylammonium bromide (CTAB) specific surface area of 150 $m^2/g$ or more, more preferably 180 $m^2/g$ or more, still more preferably 190 $m^2/g$ or more, in order to significantly improve abrasion resistance and performance on ice and snow. The CTAB specific surface area is preferably 400 $m^2/g$ or less, more preferably 300 $m^2/g$ or less, in order to obtain good dispersion of silica. The CTAB specific surface area is determined in accordance with ASTM D3765-92.

Non-limiting examples of commercially available fine particle silica include Nipsil AQ ($N_2SA$: 200 $m^2/g$, CTAB specific surface area: 155 $m^2/g$) available from Tosoh Silica Corporation; Zeosil Premium 200MP ($N_2SA$: 200 $m^2/g$, CTAB specific surface area: 200 $m^2/g$) and HRS 1200MP ($N_2SA$: 200 $m^2/g$, CTAB specific surface area: 195 $m^2/g$) both available from Rhodia; and Ultrasil 9000GR ($N_2SA$: 240 $m^2/g$, CTAB specific surface area: 200 $m^2/g$) available from Evonik.

In the cap tread rubber composition, the amount of the fine particle silica per 100 parts by mass of the rubber component is 50 parts by mass or more, preferably 55 parts by mass or more, more preferably 60 parts by mass or more, in order to obtain good abrasion resistance and good performance on ice and snow. The upper limit of the amount of the fine particle silica is not particularly limited, but is preferably 150 parts by mass or less, more preferably 120 parts by mass or less, in order to obtain good processability and good fuel economy.

The amount of the fine particle silica based on 100% by mass of the total silica is preferably 30% by mass or more, more preferably 50% by mass or more, still more preferably 60% by mass or more, in order to obtain good abrasion resistance and good performance on ice and snow. The upper limit is not particularly limited and may be 100% by mass.

The cap tread rubber composition preferably contains a silane coupling agent together with silica. Examples of the silane coupling agent include sulfide silane coupling agents such as bis(3-triethoxysilylpropyl)disulfide; mercapto silane coupling agents such as 3-mercaptopropyl-trimethoxysilane and 3-octanoylthiopropyltriethoxysilane; vinyl silane coupling agents such as vinyltriethoxysilane; amino silane coupling agents such as 3-aminopropyl-triethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Among these, sulfide silane coupling agents are preferred. The amount of the silane coupling agent per 100 parts by mass of silica is preferably 0.5 to 20 parts by mass, more preferably 1.5 to 15 parts by mass.

The cap tread rubber composition preferably contains carbon black as filler. In this case, the resulting tire has improved abrasion resistance and other properties and therefore a significantly improved balance of the properties.

The carbon black preferably has a nitrogen adsorption specific surface area ($N_2SA$) of 50 $m^2/g$ or more, more preferably 90 $m^2/g$ or more, in order to provide good abrasion resistance and other properties. The $N_2SA$ is preferably 180 $m^2/g$ or less, more preferably 130 $m^2/g$ or less, in order to obtain good dispersibility. The $N_2SA$ of the carbon black can be determined in accordance with JIS K 6217-2:2001.

The amount of carbon black per 100 parts by mass of the rubber component is preferably 5 parts by mass or more, more preferably 8 parts by mass or more. The amount of carbon black is preferably 60 parts by mass or less, more preferably 40 parts by mass or less. When the amount falls within the range indicated above, the balance of the properties can be significantly improved.

The cap tread rubber composition preferably contains a plasticizer in order to suitably achieve the effects of the present invention. The term "plasticizer" refers to a material that imparts plasticity to a rubber component. Examples include fats and oils such as process oils, extender oils, vegetable oils, and animal fats; resins such as liquid polymers and liquid resins; and waxes. More specifically, the plasticizer is a component that can be extracted from a rubber composition using acetone.

The amount of the plasticizer per 100 parts by mass of the rubber component is preferably 20 parts by mass or more, more preferably 30 parts by mass or more, in order to improve processability and performance on ice and snow. The upper limit of the amount of the plasticizer is not particularly limited, but is preferably 150 parts by mass or less, more preferably 130 parts by mass or less, still more preferably 100 parts by mass or less, particularly preferably 80 parts by mass or less, in order to obtain good abrasion resistance and other properties.

The plasticizer to be used in the cap tread rubber composition is preferably a liquid plasticizer. The term "liquid plasticizer" refers to a plasticizer that is liquid at 20° C., and examples include fats and oils and resins as mentioned above.

The amount of the liquid plasticizer per 100 parts by mass of the rubber component is preferably 15 parts by mass or more, more preferably 20 parts by mass or more, still more preferably 25 parts by mass or more, in order to improve processability and performance on ice and snow. The upper limit of the amount of the liquid plasticizer is not particularly limited, but is preferably 150 parts by mass or less, more preferably 100 parts by mass or less, in order to obtain good abrasion resistance and other properties.

The cap tread rubber composition preferably contains, as the liquid plasticizer, an oil having a polycyclic aromatic content as determined by IP346 method of less than 3% by mass (low PCA oil). Examples of low PCA oil include mild extraction solvates (MES), treated distillate aromatic extracts (TDAE), heavy naphthenic oils, and vegetable oils. The amount of low PCA oil per 100 parts by mass of the rubber component is preferably 5 to 100 parts by mass, more preferably 10 to 90 parts by mass, still more preferably 15 to 80 parts by mass.

The cap tread rubber composition preferably contains an organic fiber. Any organic fiber may be used including those known in the tire field. A suitable example is a composite (fiber) consisting of a hydrophilic resin whose surface is provided with a coating layer.

The hydrophilic resin may be a resin that can have an affinity for water, that is, a resin having a hydrophilic group in the molecule. Examples include ethylene-vinyl alcohol copolymers, vinyl alcohol homopolymers, poly(meth)acrylate resins, polyamide resins, aliphatic polyamide-based resins, aromatic polyamide-based resins, polyester resins, polyolefin resins, polyvinyl alcohol-based resins, cellulosic resins, and acrylic resins.

The surface of the composite (fiber) of the hydrophilic resin has an affinity for the rubber component. Preferably, the surface of the composite is provided with a coating layer formed of a low melting point resin having a melting point lower than the maximum vulcanization temperature (hereinafter, also referred to as "low melting point resin"). In this case, the composite (fiber) shows a good affinity for the neighboring rubber component while effectively maintaining the affinity for water of the hydrophilic resin itself. Furthermore, when a foaming agent is incorporated, the hydrophilic resin, which is less likely to melt during vulcanization, can be captured and thus the formation of holes inside the composite (fiber) can be promoted.

Examples of the resin having an affinity for the rubber component include resins having a solubility parameter (SP value) close to that of the rubber component.

The low melting point resin refers to a resin having a melting point lower than the maximum vulcanization temperature. The maximum vulcanization temperature refers to the maximum temperature reached by the rubber composition during vulcanization. The upper limit of the melting point of the low melting point resin is preferably lower by 10° C. or more, more preferably lower by 20° C. or more than the maximum vulcanization temperature. For example, in the case where the maximum vulcanization temperature is set at 190° C., the melting point of the low melting point resin is usually selected within the range of lower than 190° C., preferably of 180° C. or lower, more preferably of 170° C. or lower. The melting point may be, for example, a peak melting temperature as determined using a DSC apparatus.

The low melting point resin may suitably be, for example, a polyolefinic resin. This allows for the formation of holes inside the composite (fiber) while improving the dispersibility of the composite (fiber) of the hydrophilic resin in the rubber component.

The polyolefinic resin may have any of branched, linear, or other structures. The polyolefinic resin may also be an ionomer resin produced by crosslinking of ethylene-methacrylic acid copolymer molecules through a metal ion. Specific examples include polyethylene, polypropylene, polybutene, polystyrene, ethylene-propylene copolymers, ethylene-methacrylic acid copolymers, ethylene-ethyl acrylate copolymers, ethylene-propylene-diene terpolymers, ethylene-vinyl acetate copolymers, and ionomer resins of the foregoing.

The composite (fiber) consisting of a hydrophilic resin provided with a coating layer formed of a low melting point resin can be produced, for example, by blending these resins with a mixing mill, and melt-spinning the blend into undrawn yarns, followed by hot drawing of the undrawn yarns into fibers.

The organic fiber, e.g. the composite, has an average length of usually 0.1 to 500 mm, preferably 0.1 to 7 mm, and an average diameter of usually 0.001 to 2 mm, preferably 0.005 to 0.5 mm. It also has an aspect ratio of usually 10 to 4,000, preferably 50 to 2,000. The aspect ratio refers to the ratio of the major axis to the minor axis of the composite (fiber).

The amount of the organic fiber, e.g. the composite, per 100 parts by mass of the rubber component is preferably 0.1 to 100 parts by mass, more preferably 0.1 to 50 parts by mass. When the amount is within the range indicated above, holes can be formed inside the organic fiber to obtain good water drainage while maintaining sufficient durability.

The cap tread rubber composition preferably contains a foaming agent. For example, when the composite is used, a gas generated by the foaming agent during vulcanization can be entered into the hydrophilic resin through the melted coating layer of a low melting point resin so that cells having a shape according to the shape of the composite (fiber), namely elongated cells can be easily formed. As the tire wears, such cells function as drainage channels to impart water drainage to the tire, thereby improving performance on ice and snow.

Examples of the foaming agent include azodicarbonamide (ADCA), dinitrosopentamethylenetetramine (DPT), dinitrosopentastyrenetetramine, benzenesulfonyl hydrazide derivatives, p,p'-oxybis(benzenesulfonyl hydrazide) (OBSH), carbon dioxide-generating ammonium bicarbonate, sodium bicarbonate, ammonium carbonate, nitrogen-generating nitrososulfonylazo compounds, N,N'-dimethyl-N,N'-dinitrosophthalamide, toluenesulfonyl hydrazide, p-toluenesulfonyl semicarbazide, and p,p'-oxybis(benzenesulfonyl semicarbazide). Among these, azodicarbonamide (ADCA), dinitrosopentamethylenetetramine (DPT), and p,p'-oxybis(benzenesulfonyl hydrazide) (OBSH) are preferred, with azodicarbonamide (ADCA) or p,p'-oxybis(benzenesulfonyl hydrazide) (OBSH) being more preferred. The amount of the foaming agent per 100 parts by mass of the rubber component is preferably 0.1 to 20 parts by mass.

A rubber vulcanizate obtained by vulcanizing the rubber composition containing the foaming agent preferably has an expansion ratio of 0.1% to 50%, more preferably 3% to 40%. When the expansion ratio is within the range indicated above, it is possible to ensure the formation of cells which effectively function as drainage channels, while maintaining a moderate amount of cells, thereby avoiding risk of impairing durability. The expansion ratio of the rubber vulcanizate refers to an average expansion ratio (Vs), specifically one calculated from the following equation (I):

$$Vs=(\rho_0/\rho_1-1)\times 100 \ (\%) \tag{I}$$

wherein $\rho_1$ represents the density (g/cm$^3$) of the rubber vulcanizate (foamed rubber), and $\rho_0$ represents the density (g/cm$^3$) of the solid phase of the rubber vulcanizate (foamed rubber).

In addition to the above materials, the cap tread rubber composition may appropriately contain various materials commonly used in the tire industry, such as antioxidants, surfactants, zinc oxide, stearic acid, waxes, vulcanizing agents, and vulcanization accelerators.

The cap tread rubber composition can be prepared by known methods. For example, it may be prepared by kneading the components in a rubber kneading machine such as an open roll mill or Banbury mixer and vulcanizing the kneadate.

[Base Tread Rubber Composition for Cold Weather Tires]

In the present invention, the cap tread rubber composition for cold weather tires is preferably used in combination with a base tread rubber composition for cold weather tires containing SBR. In this case, the difference in rubber properties between the cap part and the base part of the tread is reduced so that the tire achieves better breaking properties and reduced noise levels.

The ratio of the SBR content in the base tread rubber composition to that in the cap tread rubber composition (mass ratio=base tread/cap tread) is preferably in the range of 100 to 1, more preferably 80 to 1, still more preferably 50 to 2, particularly preferably 40 to 3. When the ratio falls within the range indicated above, the balance of rubber physical properties between the cap and base treads can be improved. In addition, the migration of fillers or other chemicals in the produced tire can be moderately reduced, and furthermore handling stability during high speed running can be improved.

In the base tread rubber composition, the amount of SBR based on 100% by mass of the rubber component is preferably 20% by mass or more, more preferably 30% by mass or more, still more preferably 40% by mass or more, in order to improve handling stability and processability. The upper limit of the amount of SBR is not particularly defined, but is preferably 80% by mass or less, more preferably 70% by mass or less, still more preferably 60% by mass or less, in order to obtain good fuel economy and good low-temperature properties.

In order to achieve a balanced improvement in fuel economy and handling stability, the base tread rubber composition preferably contains silica in an amount of 0.1 to 10 parts by mass, more preferably 0.3 to 8 parts by mass, still more preferably 0.5 to 5 parts by mass, per 100 parts by mass of the rubber component. Any type of silica may be used. In view of resistance to breakage and other properties, the silica may suitably be one having a nitrogen adsorption specific surface area ($N_2SA$) of 50 $m^2/g$ or more, more preferably 100 to 200 $m^2/g$, still more preferably 150 to 200 $m^2/g$.

The base tread rubber composition may appropriately contain various materials as described for the cap tread rubber composition. It may also be prepared as described above.

[Cold Weather Tire]

A cold weather tire including the cap tread rubber composition and the base tread rubber composition can be produced from these rubber compositions by usual methods. Specifically, the unvulcanized cap tread and base tread rubber compositions, which contain various additives as needed, may extruded and processed into the shape of the respective components, and formed and assembled with other tire components on a tire building machine to build an unvulcanized tire. The unvulcanized tire is heated and pressurized in a vulcanizer to produce a tire.

According to the present invention, the rubber composition can be used to produce a pneumatic tire or non-pneumatic tire. Such cold weather tires can be used as tires for passenger vehicles, trucks and buses, two-wheeled vehicles, or other vehicles, or as high performance tires.

EXAMPLES

The present invention is specifically described with reference to, but not limited to, examples below.

The chemicals used in examples and comparative examples are listed below.

NR: TSR

BR 1: see Production Example 1 below (modified high-cis BR)

BR 2: BR-150B available from Ube Industries, Ltd.

SBR: Buna SL4525-0 (styrene content: 25% by mass, non-oil extended, unmodified S-SBR) available from Lanxess Silica 1: Ultrasil 9000GR ($N_2SA$: 240 $m^2/g$, CTAB: 200 $m^2/g$) available from Evonik Silica 2: Nipsil AQ ($N_2SA$: 200 $m^2/g$, CTAB: 155 $m^2/g$) available from Tosoh Silica Corporation Silica 3: Ultrasil VN3 ($N_2SA$: 175 $m^2/g$, CTAB: 175 $m^2/g$) available from Evonik Silane coupling agent: Si75 available from Evonik Carbon black: DIABLACK I (ISAF class, $N_2SA$: 114 $m^2/g$) available from Mitsubishi Chemical Corporation Oil: Vivatec 500 (TDAE oil) available from H&R Resin: YS resin PX-1250 (terpene resin, softening point: 125° C.) available from Yasuhara Chemical Co., Ltd.

Stearic acid: stearic acid beads "Tsubaki" available from NOF Corporation

Antioxidant: NOCRAC 6C (N-(1,3-dimethylbutyl)-N-phenyl-p-phenylenediamine) available from Ouchi Shinko Chemical Industrial Co., Ltd.

Zinc oxide: Zinc oxide #2 available from Mitsui Mining & Smelting Co., Ltd.

Foaming agent: NEOCELLBORN SB #51 (4,4'-oxybis(benzenesulfonyl hydrazide)) available from Eiwa Chemical Ind. Co., Ltd.

Organic fiber: see Production Example 2 below

Wax: Ozoace 0355 available from Nippon Seiro Co., Ltd.

Sulfur: powdered sulfur available from Tsurumi Chemical Industry Co., Ltd.

Vulcanization accelerator 1: NOCCELER D (N,N'-diphenylguanidine) available from Ouchi Shinko Chemical Industrial Co., Ltd.

Vulcanization accelerator 2: NOCCELER NS (N-tert-butyl-2-benzothiazolylsulfenamide) available from Ouchi Shinko Chemical Industrial Co., Ltd.

Production Example 1

Modified High-Cis BR

A 5 L autoclave in a nitrogen atmosphere was charged with 2.4 kg of cyclohexane and 300 g of 1,3-butadiene. To the autoclave was charged a catalyst previously prepared by reacting and aging 1,3-butadiene (4.5 mmol) with a solution of neodymium versatate (0.09 mmol) in cyclohexane, a solution of methylalumoxane (1.0 mmol) in toluene, and a solution of diisobutylaluminium hydride (3.5 mmol) and diethylaluminum chloride (0.18 mmol) in toluene at 50° C. for 30 minutes, followed by performing a polymerization reaction at 80° C. for 70 minutes.

Next, a solution of 3-glycidoxypropyltrimethoxysilane (4.5 mmol) in toluene was added and reacted for 30 minutes to modify the active terminal, with the reaction temperature being maintained at 60° C. Thereto was added a methanol solution containing 1.5 g of 2,4-di-tert-butyl-p-cresol.

Subsequently, the modified polymer solution was added to 20 L of an aqueous solution adjusted to a pH of 10 with sodium hydroxide, followed by removal of the solvent at 110° C. for two hours and then drying using a roll at 110° C. to obtain BR 1 (modified high-cis BR). The obtained polymer had a cis content of 97% by mass, a vinyl content of 1.1%, and a Mw of 480,000.

The molecular weight, vinyl content, and cis content of the polymer were analyzed as follows.

<Molecular Weight>

The weight average molecular weight (Mw) and number average molecular weight (Mn) were determined by gel permeation chromatography (GPC) under the following conditions (1) to (8).
(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/minute
(6) Injection amount: 5 µL
(7) Detector: differential refractometer
(8) Molecular weight standards: polystyrene standards <Identification of Polymer Structure>

The structure of the polymer was identified with a device of JNM-ECA series available from JEOL Ltd. The vinyl content and cis content were calculated from the data.

Production Example 2

Production of Organic Fiber (Hydrophilic Resin Fiber Provided with Low Melting Point Resin Coating Layer)

Into a twin screw extruder were introduced 40 parts by mass of polyethylene (NOVATEC HJ360 (MFR: 5.5, melting point: 132° C.) available from Japan Polyethylene Corporation) and 40 parts by mass of an ethylene-vinyl alcohol copolymer (EVAL F104B (MFR: 4.4, melting point: 183° C.) available from Kuraray Co., Ltd.), and they were simultaneously extruded to prepare a hydrophilic resin fiber provided with a coating layer formed of polyethylene in a usual manner. The hydrophilic resin fiber had an average diameter of 20 µm and an average length of 3 mm.

<Method of Preparing Cap Tread Rubber Composition for Cold Weather Tires>

According to each of the formulations shown in Tables 1 and 3, the materials listed in the Base kneading step section were kneaded in a 1.7 L Banbury mixer (Kobe Steel, Ltd.) at 150° C. for five minutes to give a kneadate. Next, the chemicals listed in the Final kneading step section were added to the kneadate, followed by kneading in an open roll mill at 80° C. for five minutes to obtain an unvulcanized rubber composition.

<Method of Preparing Base Tread Rubber Composition for Cold Weather Tires>

According to the formulation shown in Table 2, the materials other than the sulfur and vulcanization accelerator were kneaded in a 1.7 L Banbury mixer (Kobe Steel, Ltd.) at 150° C. for five minutes to give a kneadate. Next, the sulfur and vulcanization accelerator were added to the kneadate, followed by kneading in an open roll mill at 80° C. for five minutes to obtain an unvulcanized rubber composition.

<Method of Preparing Test Tire>

The unvulcanized cap tread rubber composition and the unvulcanized base tread rubber composition were formed into the shape of a cap tread and a base tread, respectively, and then assembled with other tire components on a tire building machine to build an unvulcanized tire, which was then vulcanized at 170° C. for 10 minutes to prepare a test tire (size: 195/65R15, cold weather tire for passenger vehicles).

[Evaluation]

The test tires prepared as above were evaluated as follows. Tables 1 and 3 show the results. In Table 1 (Examples 1 to 6, Comparative Examples 1 to 3), the results are expressed as an index relative to Comparative Example 1 taken as reference. In Table 3, the results of Example 1 and Comparative Example 4 and the results of Comparative Example 5 are expressed as an index relative to Comparative Example 1 and Comparative Example 6, respectively, taken as reference.

<Expansion Ratio Vs>

The expansion ratio of each cap tread formulation was calculated from the above-described equation (I).

<Fuel Economy>

The rolling resistance of each test tire was measured using a rolling resistance tester by running the test tire mounted on a 15×6 JJ rim at an internal pressure of 230 kPa, a load of 3.43 kN, and a speed of 80 km/h. The results are expressed as an index, with the reference comparative example set equal to 100. A higher index indicates better fuel economy. Tires with an index of 85 or higher are practically acceptable.

<Abrasion Resistance>

Each set of test tires was mounted on a front-engine, front-wheel-drive car of 2,000 cc displacement made in Japan. After a mileage of 8,000 km, the groove depth in the tire tread portion was measured. The distance at which the tire groove depth decreased by 1 mm was calculated and expressed as an index using the equation below. A higher index indicates better abrasion resistance.

Abrasion resistance index=(Distance at which groove depth of tire of each example decreased by 1 mm)/(Distance at which groove depth of tire of reference comparative example decreased by 1 mm)×100

<Performance on Ice (Grip Performance on Ice)>

The performance on ice of each set of test tires mounted on a vehicle was evaluated under the following conditions. Each set of test tires was mounted on a front-engine, front-wheel-drive car of 2,000 cc displacement made in Japan. The test was performed on ice at the Asahikawa Tire Proving Ground of Sumitomo Rubber Industries, Ltd. in Hokkaido, Japan. The temperature on ice was −6° C. to −1° C.

Braking performance (brake stopping distance on ice): The stopping distance on ice was measured, which corresponded to the distance required for the car to stop after the brakes that lock up were applied at 30 km/h. The results are expressed as an index using the equation below, with the reference comparative example set equal to 100. A higher index indicates better braking performance on ice. Tires with an index of 85 or higher are practically acceptable.

(Index of grip on ice)=(Stopping distance of reference comparative example)/(Stopping distance of each formulation example)×100

<Handling Stability in Cold Weather, High Speed Conditions>

Each set of test tires was mounted on a front-engine, front-wheel-drive car of 2,000 cc displacement made in Japan. A test driver drove the car at 100 km/h on snow- and ice-free roads at 0° C. to 3° C. at the Asahikawa Tire Proving Ground in Hokkaido, Japan. The test driver subjectively evaluated cornering performance and steering linearity. The subjective evaluation was made relative to the reference comparative example given a score of 100, as follows: A score of 120 was given if the test driver judged the performance was obviously improved; a score of 140 was given if a much better level of performance was observed.

<Grip Performance in Cold Weather, High Speed Conditions>

Each set of test tires was mounted on a front-engine, front-wheel-drive car of 2,000 cc displacement made in Japan. The car was driven on snow- and ice-free roads at 0° C. to 3° C. at the Asahikawa Tire Proving Ground in Hokkaido, Japan. The stopping distance was measured, which corresponded to the distance required for the car to stop after the brakes that lock up were applied at 100 km/h.

The results are expressed as an index using the equation below, with the reference comparative example set equal to 100. A higher index indicates better grip performance (braking performance) in cold weather, high speed conditions.

(Index of grip performance in cold weather, high speed conditions)=(Stopping distance of reference comparative example)/(Stopping distance of each formulation example)×100

TABLE 2

| Base tread rubber composition | | | |
|---|---|---|---|
| | | | Formulation |
| Formulation (parts by mass) | Base kneading step | NR | 40 |
| | | BR2 (BR150B) | 15 |
| | | SBR (unmodified) | 45 |
| | | Silica 3 ($N_2SA$ 175) | 5 |
| | | Carbon black ($N_2SA$ 114) | 40 |
| | | Oil (TDAE) | 20 |
| | | Wax | 1.5 |
| | | Stearic acid | 2 |
| | | Antioxidant | 2 |
| | | Zinc oxide | 3 |
| | Final kneading step | Sulfur | 2.5 |
| | | Vulcanization accelerator 2 | 2 |

The results in Table 1 demonstrate that, in the examples where a relatively small amount of SBR was added to a certain formulation containing predetermined amounts of NR, BR, and fine particle silica, a highly balanced improvement in fuel economy, abrasion resistance, performance on ice and snow, and high speed performance (handling stability, grip performance) on cold roads was achieved. In contrast, in the comparative examples where no SBR was added, or a predetermined amount of fine particle silica was not used, or a relatively large amount of SBR was added, greatly inferior properties were exhibited.

TABLE 1

| Cap tread rubber composition | | | | | | | | | | | | |
|---|---|---|---|---|---|---|---|---|---|---|---|---|
| | | | | Example | | | | | | Comparative Example | | |
| | | | | 1 | 2 | 3 | 4 | 5 | 6 | 1 | 2 | 3 |
| Amount (parts by mass) | Base kneading step | NR | | 43 | 45 | 40 | 34 | 43 | 43 | 50 | 43 | 35 |
| | | BR1 (modified high-cis BR) | | 50 | 50 | 58 | 60 | 50 | 50 | 50 | 50 | 50 |
| | | SBR (unmodified) | | 7 | 5 | 2 | 6 | 7 | 7 | — | 7 | 15 |
| | | Silica 1 ($N_2SA$ 240) | | 80 | 70 | 60 | 50 | 80 | — | — | — | 80 |
| | | Silica 2 ($N_2SA$ 200) | | — | — | — | — | — | 80 | — | — | — |
| | | Silica 3 ($N_2SA$ 175) | | — | — | — | 50 | — | — | 80 | 80 | — |
| | | Silane coupling agent (Si75) | | 5 | 4.5 | 4 | 10 | 5 | 5 | 5 | 5 | 5 |
| | | Carbon black ($N_2SA$ 114) | | 10 | 20 | 30 | 10 | 10 | 10 | 10 | 10 | 10 |
| | | Oil (TDAE) | | 30 | 30 | 30 | 60 | 30 | 30 | 30 | 30 | 30 |
| | | Resin | | — | — | — | 25 | — | — | — | — | — |
| | | Stearic acid | | 0.5 | 0.5 | 0.5 | 0.5 | 0.5 | 0.5 | 0.5 | 0.5 | 0.5 |
| | | Vulcanization accelerator 1 | | 1.5 | 1.5 | 1 | 1.5 | 1.5 | 1.5 | 1.5 | 1.5 | 1.5 |
| | | Antioxidant | | 2 | 2 | 2 | 2 | 2 | 2 | 2 | 2 | 2 |
| | | Zinc oxide | | 1.2 | 1.2 | 1.2 | 1.2 | 1.2 | 1.2 | 1.2 | 1.2 | 1.2 |
| | Final kneading step | Sulfur | | 1.5 | 1.5 | 1.5 | 2 | 1.5 | 1.5 | 1.5 | 1.5 | 1.5 |
| | | Foaming agent | | 5 | 5 | 5 | 5 | — | 5 | 5 | 5 | 5 |
| | | Organic fiber | | 0.5 | 0.5 | 0.5 | 0.5 | — | 0.5 | 0.5 | 0.5 | 0.5 |
| | | Stearic acid | | 1 | 1 | 1 | 1 | 1 | 1 | 1 | 1 | 1 |
| | | Vulcanization accelerator 1 | | 0.5 | 0.5 | 0.5 | 0.5 | 0.5 | 0.5 | 0.5 | 0.5 | 0.5 |
| | | Vulcanization accelerator 2 | | 1.7 | 1.5 | 1.5 | 1.7 | 1.5 | 1.7 | 1.5 | 1.5 | 1.7 |
| | | Expansion ratio (%) | | 32 | 30 | 28 | 24 | 0 | 33 | 32 | 34 | 32 |
| Evaluation results | | Fuel economy | | 105 | 100 | 95 | 86 | 91 | 108 | 100 | 100 | 96 |
| | | Abrasion resistance | | 108 | 110 | 114 | 108 | 118 | 102 | 100 | 103 | 97 |
| | | Performance on ice | | 107 | 100 | 98 | 118 | 86 | 102 | 100 | 100 | 92 |
| | | Handling stability in cold weather, high speed conditions | | 120 | 120 | 120 | 140 | 140 | 120 | 100 | 120 | 102 |
| | | Grip performance in cold weather, high speed conditions | | 110 | 115 | 128 | 123 | 112 | 104 | 100 | 100 | 104 |

TABLE 3

Cap tread rubber composition

| | | | Example 1 | Comparative Example 4 | Comparative Example 5 | Comparative Example 6 |
|---|---|---|---|---|---|---|
| Formulation (parts by mass) | Base kneading step | NR | 43 | 50 | 68 | 75 |
| | | BR1 (modified high-cis BR) | 50 | 50 | 25 | 25 |
| | | SBR (unmodified) | 7 | — | 7 | — |
| | | Silica 1 (N₂SA 240) | 80 | 80 | 80 | 80 |
| | | Silica 2 (N₂SA 200) | — | — | — | — |
| | | Silica 3 (N₂SA 175) | — | — | — | — |
| | | Silane coupling agent (Si75) | 5 | 5 | 5 | 5 |
| | | Carbon black (N₂SA 114) | 10 | 10 | 10 | 10 |
| | | Oil (TDAE) | 30 | 30 | 30 | 30 |
| | | Resin | — | — | — | — |
| | | Stearic acid | 0.5 | 0.5 | 0.5 | 0.5 |
| | | Vulcanization accelerator 1 | 1.5 | 1.5 | 1.5 | 1.5 |
| | | Antioxidant | 2 | 2 | 2 | 2 |
| | | Zinc oxide | 1.2 | 1.2 | 1.2 | 1.2 |
| | Final kneading step | Sulfur | 1.5 | 1.5 | 1.5 | 1.5 |
| | | Foaming agent | 5 | 5 | 5 | 5 |
| | | Organic fiber | 0.5 | 0.5 | 0.5 | 0.5 |
| | | Stearic acid | 1 | 1 | 1 | 1 |
| | | Vulcanization accelerator 1 | 0.5 | 0.5 | 0.5 | 0.5 |
| | | Vulcanization accelerator 2 | 1.7 | 1.7 | 1.7 | 1.7 |
| | | Expansion ratio (%) | 32 | 31 | 30 | 28 |
| Evaluation results | | Fuel economy | 105 | 98 | 100 | 100 |
| | | Abrasion resistance | 108 | 101 | 100 | 100 |
| | | Performance on ice | 107 | 100 | 98 | 100 |
| | | Handling stability in cold weather, high speed conditions | 120 | 98 | 105 | 100 |
| | | Grip performance in cold weather, high speed conditions | 110 | 100 | 102 | 100 |

The results in Table 3 show that, in the cases where a small amount of SBR was added to a certain formulation containing 50 parts of BR according to the present invention (Example 1 vs. Comparative Example 4), the balance of fuel economy, abrasion resistance, performance on ice and snow, and high speed performance (handling stability, grip performance) on cold roads was significantly improved as compared to the cases where a small amount of SBR was added to a formulation containing 25 parts of BR, which was outside the certain range of the present invention (Comparative Example 5 vs. Comparative Example 6). It is therefore demonstrated that the balance of the properties was synergistically improved by adding a relatively small amount of SBR to a certain formulation containing predetermined amounts of NR, BR, and fine particle silica.

The invention claimed is:

1. A cap tread rubber composition for cold weather tires, the cap tread rubber composition comprising:
a rubber component including polybutadiene rubber, styrene butadiene rubber, and at least one of natural rubber or polyisoprene rubber; and
a filler,
the rubber composition having a combined amount of the natural rubber, the polyisoprene rubber, and the polybutadiene rubber of 80% by mass or more, an amount of the polybutadiene rubber of 30% by mass or more, and an amount of the styrene butadiene rubber of 0.3% to 10% by mass, each based on 100% by mass of the rubber component,
the filler including 60% by mass or more of silica based on 100% by mass of the filler,
the rubber composition comprising a fine particle silica having a nitrogen adsorption specific surface area of 190 m²/g or more in an amount of 50 parts by mass or more per 100 parts by mass of the rubber component.

2. The cap tread rubber composition for cold weather tires according to claim 1,
wherein the rubber composition has a combined amount of the natural rubber, the polyisoprene rubber, and the polybutadiene rubber of 90% by mass or more, and an amount of the styrene butadiene rubber of 0.3% to 5% by mass, each based on 100% by mass of the rubber component.

3. The cap tread rubber composition for cold weather tires according to claim 1,
wherein the rubber composition comprises the silica in an amount of 80 parts by mass or more per 100 parts by mass of the rubber component, and
the fine particle silica has a nitrogen adsorption specific surface area of 210 m²/g or more.

4. The cap tread rubber composition for cold weather tires according to claim 1,
wherein the polybutadiene rubber has a cis content of 70% by mass or more.

5. The cap tread rubber composition for cold weather tires according to claim 1,
wherein the rubber composition comprises a plasticizer in an amount of 20 parts by mass or more per 100 parts by mass of the rubber component.

6. A cold weather tire comprising a cap tread produced using the rubber composition according to claim 1.

* * * * *